united States Patent
Iwasaki et al.

(10) Patent No.: US 10,974,902 B2
(45) Date of Patent: Apr. 13, 2021

(54) SUBSTRATE INVERTING DEVICE

(71) Applicant: SAKAI DISPLAY PRODUCTS CORPORATION, Sakai (JP)

(72) Inventors: Shinji Iwasaki, Sakai (JP); Nobuhiro Yonezawa, Sakai (JP)

(73) Assignee: SAKAI DISPLAY PRODUCTS CORPORATION, Sakai (JP)

( * ) Notice: Subject to any disclaimer, the term of this patent is extended or adjusted under 35 U.S.C. 154(b) by 113 days.

(21) Appl. No.: 16/316,860

(22) PCT Filed: Jul. 11, 2016

(86) PCT No.: PCT/JP2016/070446
§ 371 (c)(1),
(2) Date: Jan. 10, 2019

(87) PCT Pub. No.: WO2018/011860
PCT Pub. Date: Jan. 18, 2018

(65) Prior Publication Data
US 2020/0180866 A1 Jun. 11, 2020

(51) Int. Cl.
*B65G 49/06* (2006.01)
*B65G 7/08* (2006.01)

(52) U.S. Cl.
CPC .............. *B65G 7/08* (2013.01); *B65G 49/06* (2013.01)

(58) Field of Classification Search
CPC .... B65G 47/24; B65G 47/244; B65G 47/248; B65G 7/08; B65G 49/06
USPC ........................................................ 414/758
See application file for complete search history.

(56) References Cited

U.S. PATENT DOCUMENTS

| 1,486,609 | A | * | 3/1924 | Schwab | B65G 7/08 414/758 |
| 3,771,680 | A | * | 11/1973 | Cathers | B65G 49/067 414/802 |
| 4,822,967 | A | * | 4/1989 | Kumagami | A23L 3/01 219/700 |
| 6,860,800 | B1 | * | 3/2005 | Maurer | B23Q 7/02 269/289 MR |
| 8,033,780 | B2 | * | 10/2011 | Watters | B25H 1/00 414/767 |

(Continued)

FOREIGN PATENT DOCUMENTS

JP H10-167467 A 6/1998
JP 2005-225637 A 8/2005

*Primary Examiner* — Lynn E Schwenning
(74) *Attorney, Agent, or Firm* — ScienBiziP, P.C.

(57) ABSTRACT

Provided is a substrate inverting device that can reverse the front and back of a substrate without causing damage and that can suppress a decrease in work efficiency due to inverting the substrate. A substrate inverting device that inverts the front and back of a substrate comprise: a rectangular frame shaped casing that encloses the circumference of a substrate to be inverted; a first holding unit that is joined to one edge of the casing so as to be able to rotate and that holds the substrate from the front side; a second holding unit that is joined to another edge of the casing facing the one edge so as to be able to rotate and that holds the substrate from the back side; and a support unit that supports the casing so that same can rotate about an axis in the horizontal direction while the substrate is held by the first holding unit and second holding unit.

7 Claims, 14 Drawing Sheets

(56) References Cited

U.S. PATENT DOCUMENTS

2014/0314539 A1* 10/2014 Lee .................... H01L 21/6838
　　　　　　　　　　　　　　　　　　　　　　414/758

* cited by examiner

SUBSTRATE INVERTING DEVICE

TECHNICAL FIELD

The present invention relates to a substrate inverting apparatus that inverts a substrate upside down.

BACKGROUND ART

Display panels such as a liquid crystal display panel and an organic electro-luminescence (EL) display panel are produced in a manner that a display element is formed between a pair of two glass substrates and electronic components such as a chip on film (COF) and a printed circuit board (PCB) are connected to an electrode portion provided in the periphery of the glass substrate pair.

Typically, in order to check a connection state between the glass substrate pair and the electronic components, an operator inverts the glass substrate pair upside down manually with the hands, and checks presence of indentations from a lower side of the glass substrate pair using a scanning electron metallurgical microscope or the like.

In addition, apparatuses for inverting the glass substrate pair upside down have been proposed. For example, Patent Literature 1 discloses a conveyor apparatus that conveys a conveyance target panel in a manner that a first pallet is overlaid on a second pallet conveyed together with the conveyance target panel placed thereon; the first and second pallets in this state are inverted upside down; the second pallet is removed; and the conveyance target panel placed on the first pallet with the sides thereof inverted is conveyed.

Furthermore, Patent Literature 2 discloses a panel inverting apparatus by which a panel is inverted upside down in a manner that the panel is placed on a surface of a first placement plate; a second placement plate is overlaid on the first placement plate; and the first and second placement plates united together are rotated to invert the panel upside down.

CITATION LIST

Patent Literature

Patent Literature 1: Japanese Patent Application Laid-Open Publication No. HEI 10-167467
Patent Literature 2: Japanese Patent Application Laid-Open Publication No. 2005-225637

SUMMARY OF INVENTION

Technical Problem

However, an increase in size of display panels may involve problems such as breakage of the display panels or breakage or falling off of the electronic components in inversion of the glass substrate pair upside down by the operator with the hands.

In a situation in which the first and second pallets are not united together in the conveyor apparatus in Patent Literature 1, it is unnecessary for the operator to move to the opposite sides of the panel after pallet inversion. However, an increase in size of the display panel involves an increase in size of the first and second pallets, thereby involving bothersome operation in putting and taking one of the pallets on and off from the other pallet.

Also, in the panel inverting apparatus disclosed in Patent Literature 2, the operator is required to move to the opposite side of the panel after panel inversion, which may reduce operation efficiency.

The present invention has been made in view of the foregoing and has its object of providing a substrate inverting apparatus that inverts a substrate upside down without involving breakage and in which reduction in operation efficiency accompanied by substrate inversion can be suppressed.

Solution to Problem

A substrate inverting apparatus according to an aspect of the present application includes a frame, a first holder, a second holder, and a support unit. The frame is in a rectangular frame shape that surrounds a periphery of the substrate that is an inversion target. The first holder is joined to one side of the frame, and holds the substrate from an upper side of the substrate. The second holder is joined to another side of the frame located opposite to the one side thereof, and holds the substrate from a lower side of the substrate. The support unit supports the frame such that the frame is rotatable about an axis extending in a horizontal direction in a state in which the first and second holders hold the substrate.

Advantageous Effects of Invention

According to the present application, the substrate can be inverted upside down without involving breakage and reduction in operation efficiency accompanied by substrate inversion can be suppressed.

DESCRIPTION OF EMBODIMENTS

An embodiment of the present invention will be described in detail with reference to drawings.

Figure 1:
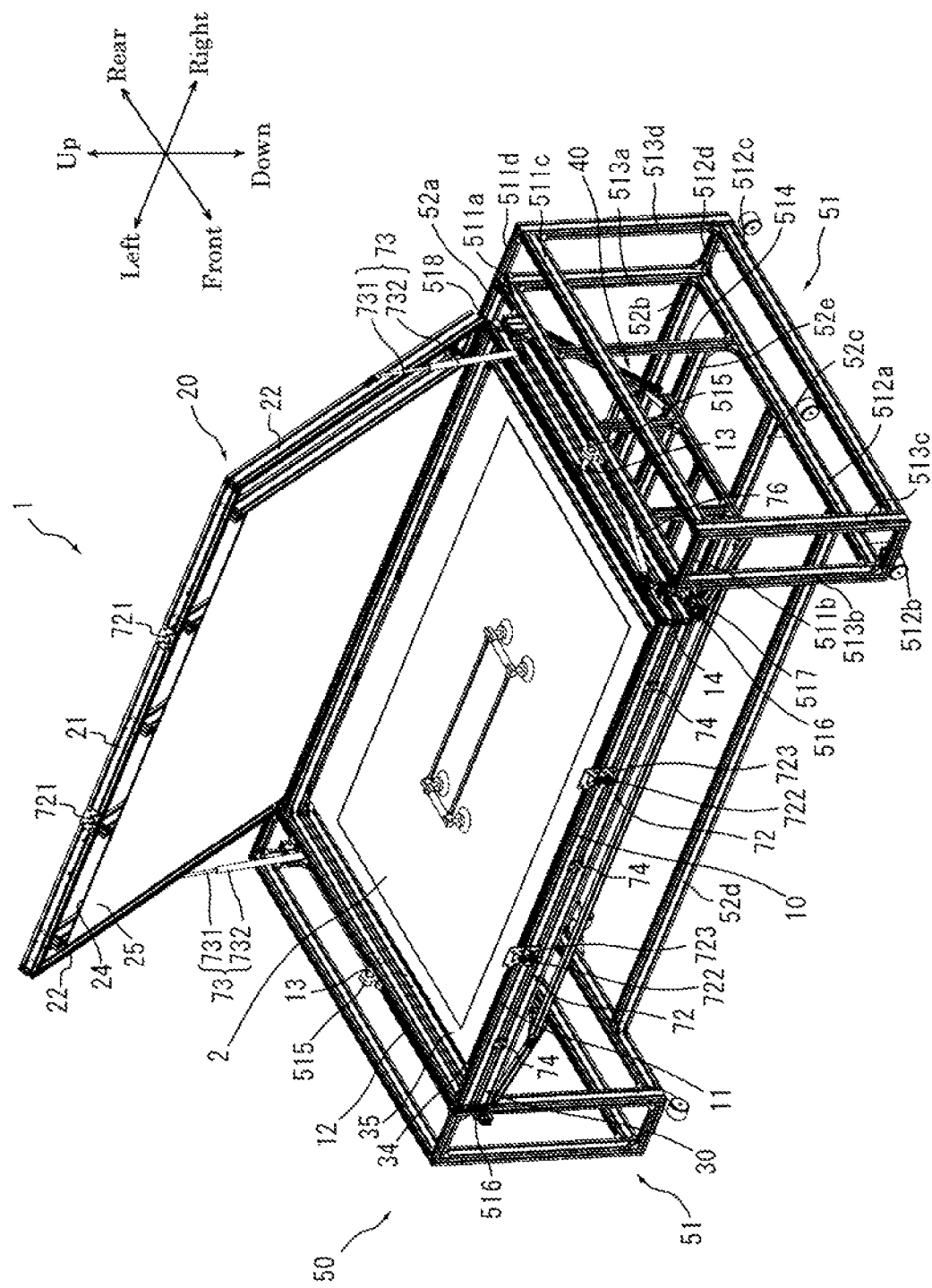
FIG. 1 is a perspective view illustrating a general configuration of a substrate inverting apparatus according to an embodiment.
Figure 2:
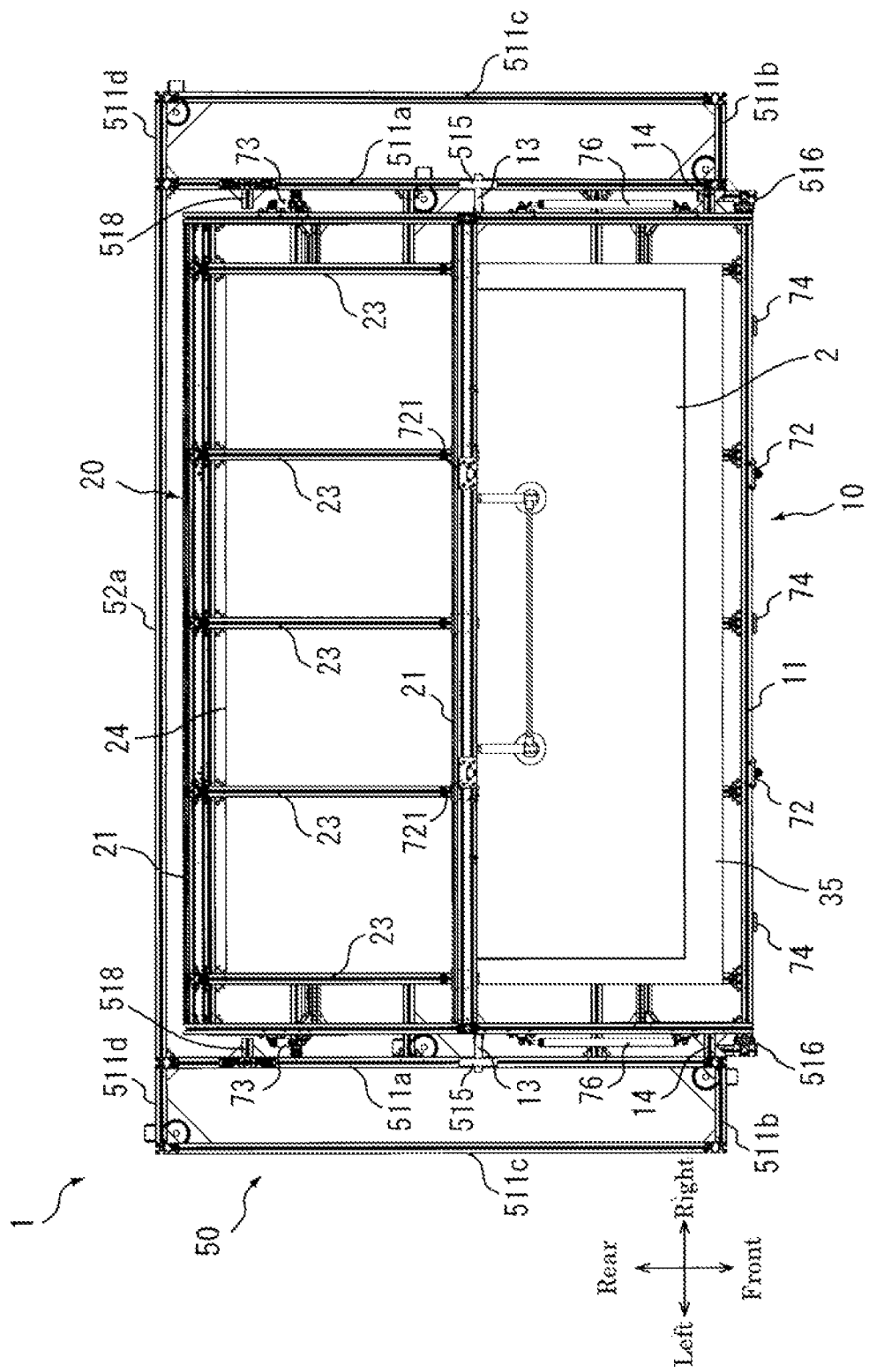
FIG. 2 is a plan view illustrating the general configuration of the substrate inverting apparatus according to the embodiment.
Figure 3:
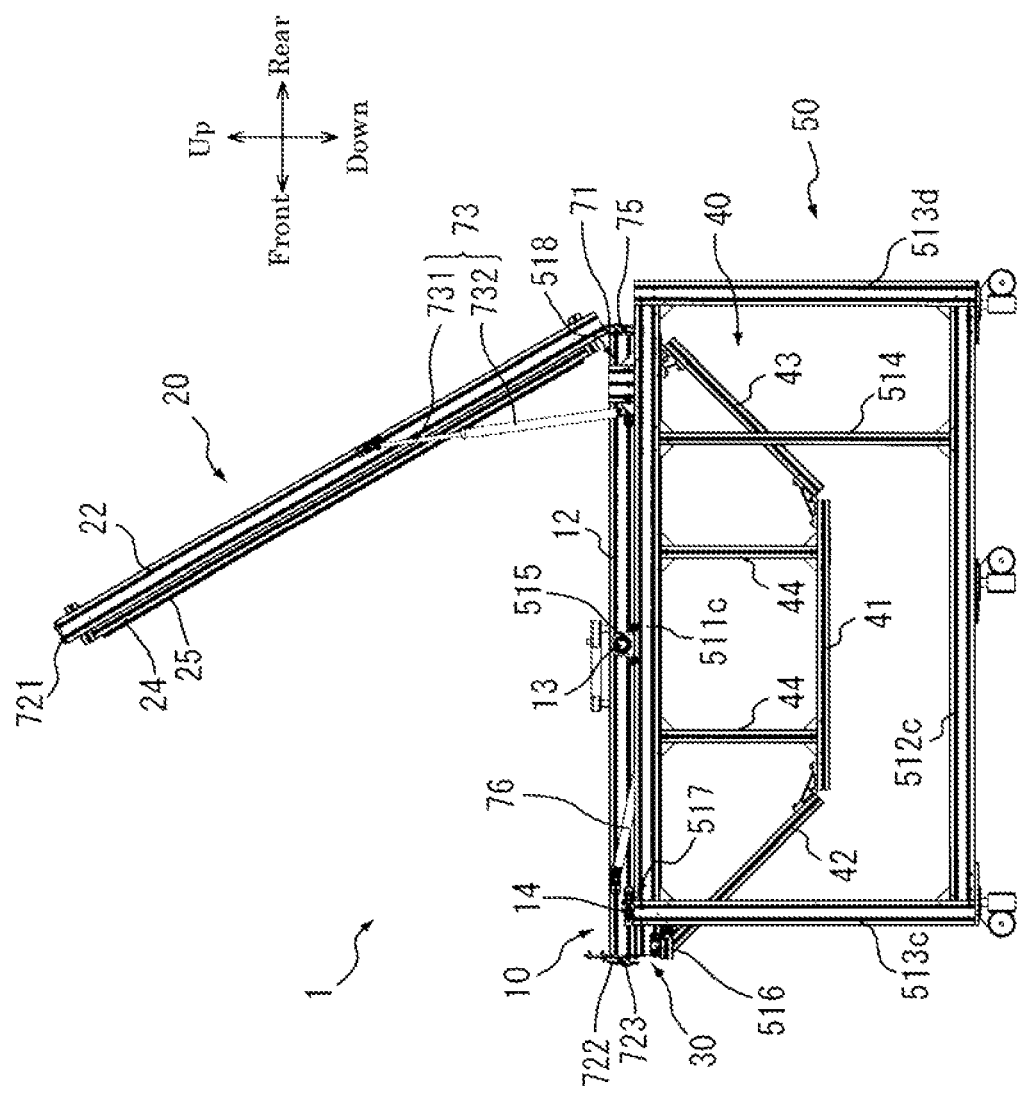
FIG. 3 is a side view illustrating the general configuration of the substrate inverting apparatus according to the embodiment.
Figure 4:
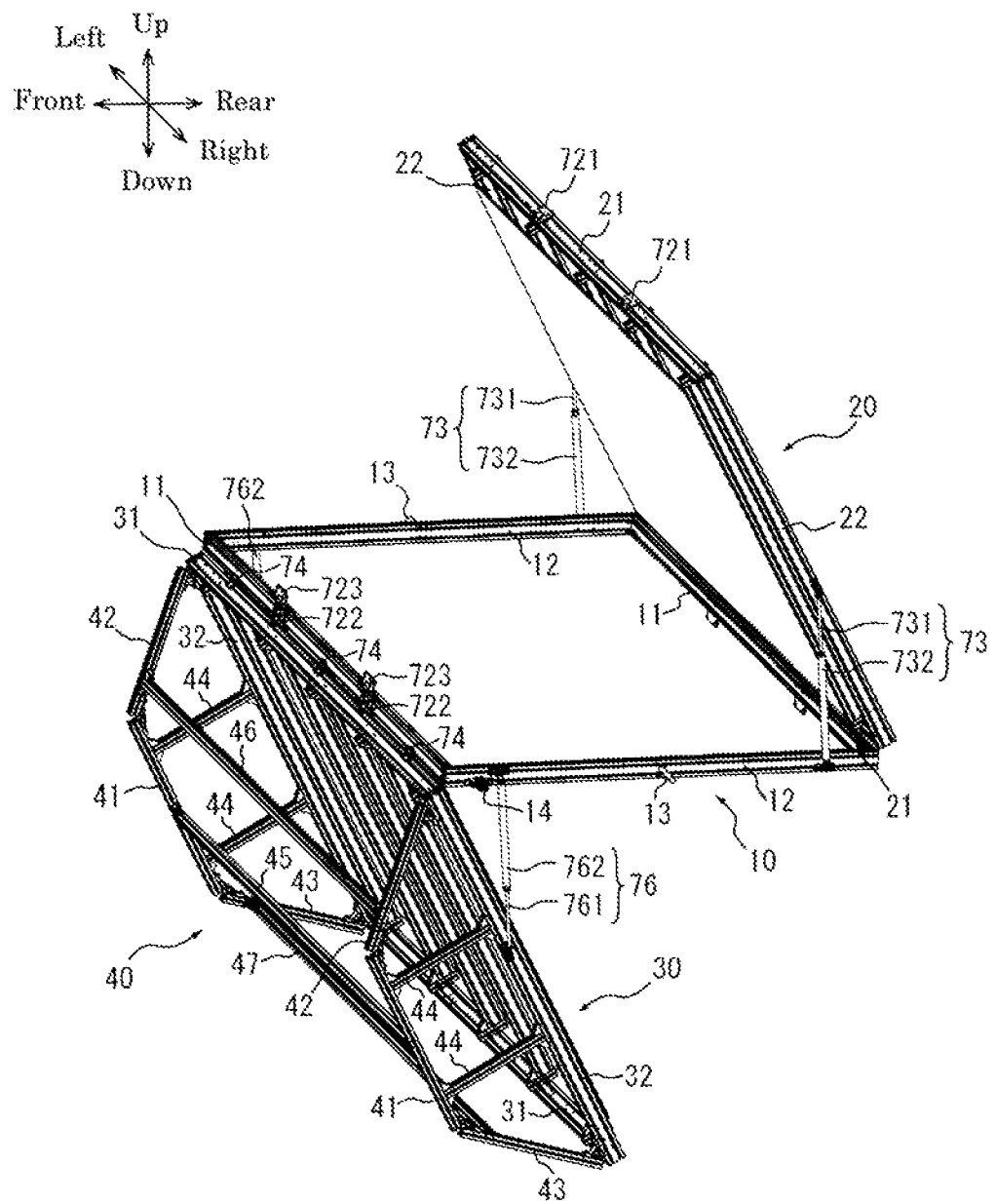
FIG. 4 is a schematic illustration illustrating a configuration of a main part of the substrate inverting apparatus according to the embodiment.

FIG. 1 is a perspective view illustrating a general configuration of a substrate inverting apparatus 1 according to the present embodiment. FIG. 2 is a plan view thereof. FIG. 3 is a side view thereof. FIG. 4 is a schematic illustration illustrating a main part thereof. The substrate inverting apparatus 1 according to the present embodiment includes a mechanism that holds horizontally a substrate 2 in a rectangular flat plate shape, such as a liquid crystal display panel, and that inverts the horizontally held substrate 2 upside down. An example illustrated in FIGS. 1 to 3 indicates a state in which the substrate 2 is held with its upper side facing upward. In the following description, the configuration of the substrate inverting apparatus 1 will be described using the terms up, down, right, left, front, and rear as indicated in the drawings.

The substrate inverting apparatus 1 according to the present embodiment includes a tray base 10, an upper tray cover 20 (first holder), a lower tray cover 30 (second holder), and a support table 50 (support unit). The tray base 10 is a frame in a rectangular frame shape that surrounds a periphery of a substrate 2 that is an inversion target. In the example illustrated in FIGS. 1 to 4, the upper tray cover 20 is located over the tray base 10 while the lower tray cover 30 is located thereunder. The support table 50 supports the tray base 10 in a rotatable manner. The upper and lower tray covers 20 and 30 are joined to the tray base 10 in a rotatable manner as will be described later.

The tray base 10 is a frame in a rectangular shape shorter in a front-back direction than in a left-right direction. The tray base 10 is an assembly of paired front and rear long-side frame members 11 and 11 and paired right and left short-side frame members 12 and 12 joined together. The tray base 10 includes shafts 13 and 13 in a columnar shape protruding outward in a horizontal direction at substantial centers of the respective frame members 12 and 12 in a longitudinal direction of the frame members 12 and 12. The support table 50 supports the shafts 13 and 13 in a rotatable manner to support the tray base 10 in a rotatable manner about an axis extending in the horizontal direction (left-right direction in the example illustrated in FIGS. 1 to 3).

The tray base 10 further includes restricting protrusions 14 and 14 protruding outward in the left-right direction in the vicinity of front edges of the respective frame members 12 and 12 in the longitudinal direction of the frame members 12 and 12. The support table 50 includes protrusion receiving portions 517 and protrusion receiving portions 518. The protrusion receiving portions 517 each receive a lower edge of a corresponding one of the restricting protrusions 14 when the upper tray cover 20 is located on the tray base 10 (when the upper side of the substrate 2 faces upward). The protrusion receiving portions 518 each receives a lower edge of a corresponding one of the restricting protrusions 14 when the lower tray cover 30 is located on the tray base 10 (when the lower side of the substrate 2 faces upward). The protrusion receiving portions 517 restrict, when the upper side of the substrate 2 faces upward, rotation of the tray base 10 that starts from a state in which the upper side of the substrate 2 faces downward. By contrast, the protrusion receiving portions 518 restrict, when the upper side of the substrate 2 faces downward, rotation of the tray base 10 that starts from a state in which the upper side of the substrate 2 faces upward.

The upper tray cover 20 includes a frame in a rectangular shape shorter in the front-back direction than in the left-right direction. The frame is an assembly of paired front and rear long-side frame members 21 and 21 and paired right and left short-side frame members 22 and 22 joined together. The long-side frame members 21 and 21 have the same length as the long-side frame members 11 and 11 of the tray base 10. The short-side frame members 22 and 22 have the same length as the short-side frame member 12 and 12 of the tray base 10.

The upper tray caver 20 includes reinforcing frame members 23 spaced apart from one another at appropriate intervals between the paired right and left frame members 22 and 22. Although a configuration including five reinforcing frame members 23 is described in the example illustrated in FIGS. 1 to 3, the number of the reinforcing frame members 23 is not limited to 5. The number and the intervals of the reinforcing frame members 23 may be changed as appropriate for example in view of size of the substrate 2, an amount of warp of the substrate 2 upon a jig such as a suction pad being thrusted on the substrate 2, and a holding state of the substrate 2.

A cushion base 24 and a cushion 25 are provided on the lower surfaces of the reinforcing frame members 23. Here, the cushion base 24 is a holder plate for holding the substrate 2 and is constituted by a rectangular plate member having an area wider than that of the substrate 2 that is a holding target. The cushion base 24 is preferably made of a metal material, a synthetic resin material, or the like having an appropriate hardness so that the substrate 2 is prevented from being excessively warped upon a jig such as a suction pad being thrusted in order to take out the held substrate 2. Note that the material of the cushion base 24 may be changed as appropriate for example in view of an amount of warp of the substrate 2 upon a jig such as a suction pad being thrusted on the substrate 2 and a holding state of the substrate 2.

The cushion 25 is for example a buffer in a rectangular plate shape having approximately the same area as that of the cushion base 24. The substrate 2 is interposed between the cushion 25 and a cushion 35 of the lower tray cover 30, which will be described later. Therefore, the cushion 25 is preferably made of a material such as rubber that is soft, that has no chargeability, and that has elasticity sufficient to interpose the substrate 2 in a state of being in contact with electronic components such as a COF and a PCB connected to the peripheral part of the substrate 2.

The upper tray cover 20 is joined to one side of the frame constituting the tray base 10 (i.e., the rear frame member 11 in the configuration illustrated in FIGS. 1 to 4) in a rotatable manner. Specifically, one of the long-side frame members 11 of the tray base 10 and a corresponding one of the long-side frame members 21 of the upper tray cover 20 are joined together at their outer surfaces by means of hinges 71 such that the upper tray cover 20 is rotatable about the tray base 10. Note that three hinges 71 are spaced apart from one another in longitudinal directions of the frame members 11 and 21 with their axis oriented in the longitudinal directions thereof. One of flaps of each hinge 71 is fixed to the outer surface of the one frame member 11, while the other flap thereof is fixed to the outer surface of the one frame member 21.

The substrate inverting apparatus 1 includes locking mechanisms 72 and 72 (first maintaining mechanism) that maintain a closed state of the upper tray cover 20 when the front frame member 21 of the upper tray cover 20 is in contact with the front frame member 11 of the tray base 10 (i.e., a state in which the upper tray cover 20 is closed). Each locking mechanism 72 includes for example a hook 721 that is disposed at the upper tray cover 20, a ring 722, and a support plate 723 that is disposed at the tray base 10. The support plate 723 supports the ring 722 in a rotatable manner. Each locking mechanism 72 is located at two parts of the front frame members 11 and 21 in the example illustrated in FIGS. 1 to 4. In the present embodiment, the closed state of the upper tray cover 20 can be maintained through engagement of the rings 722 with the hooks 721 in a state in which the upper tray cover 20 is closed.

The substrate inverting apparatus 1 includes rotation mechanisms 73 and 73 that rotate the upper tray cover 20 about an axis of each hinge 71 as a rotation center when the closed state of the upper tray cover 20 maintained by the locking mechanisms 72 and 72 is released, that is, when the rings 722 are disengaged from the hooks 721. Each of the rotation mechanisms 73 is for example a damper and includes a rod 731 extending and contracting in its axial direction and a cylindrical housing 732 that houses the rod 731. The rod 731 has a tip end connected in a rotatable manner to a corresponding one of the frame members 22 of the upper tray cover 20 at a substantial center of the frame member 22 in a longitudinal direction of the frame member 22. The housing 732 has a lower end (i.e., end far from the rod 731) connected to a rear end of a corresponding one of the frame members 12 of the tray base 10 in the longitudinal direction of the frame member 12 in a rotatable manner. In the above configuration, when the upper tray cover 20 is disengaged from the tray base 10, the rod 731 extends to rotate the upper tray cover 20 in a direction away from the front frame member 11 (i.e., another side of the frame opposite to the one side) of the tray base 10 about the axis of each hinge 71 as a rotation center. The rotation mechanisms 73 urge the upper tray cover 20 so that an opening angle of the upper tray cover 20 is approximately 60 degrees relative to the tray base 10.

The lower tray cover 30 includes a frame in a rectangular shape shorter in the front-back direction than in the left-right direction. This frame is an assembly of paired front and rear long-side frame members 31 and 31 and paired right and left short-side frame members 32 and 32 joined together (see FIG. 4). The long-side frame members 31 and 31 have the same length as the long-side frame members 11 and 11 of the tray base 10. The short-side frame members 32 and 32 have the same length as the short-side frame members 12 and 12 of the tray base 10.

Figure 11:
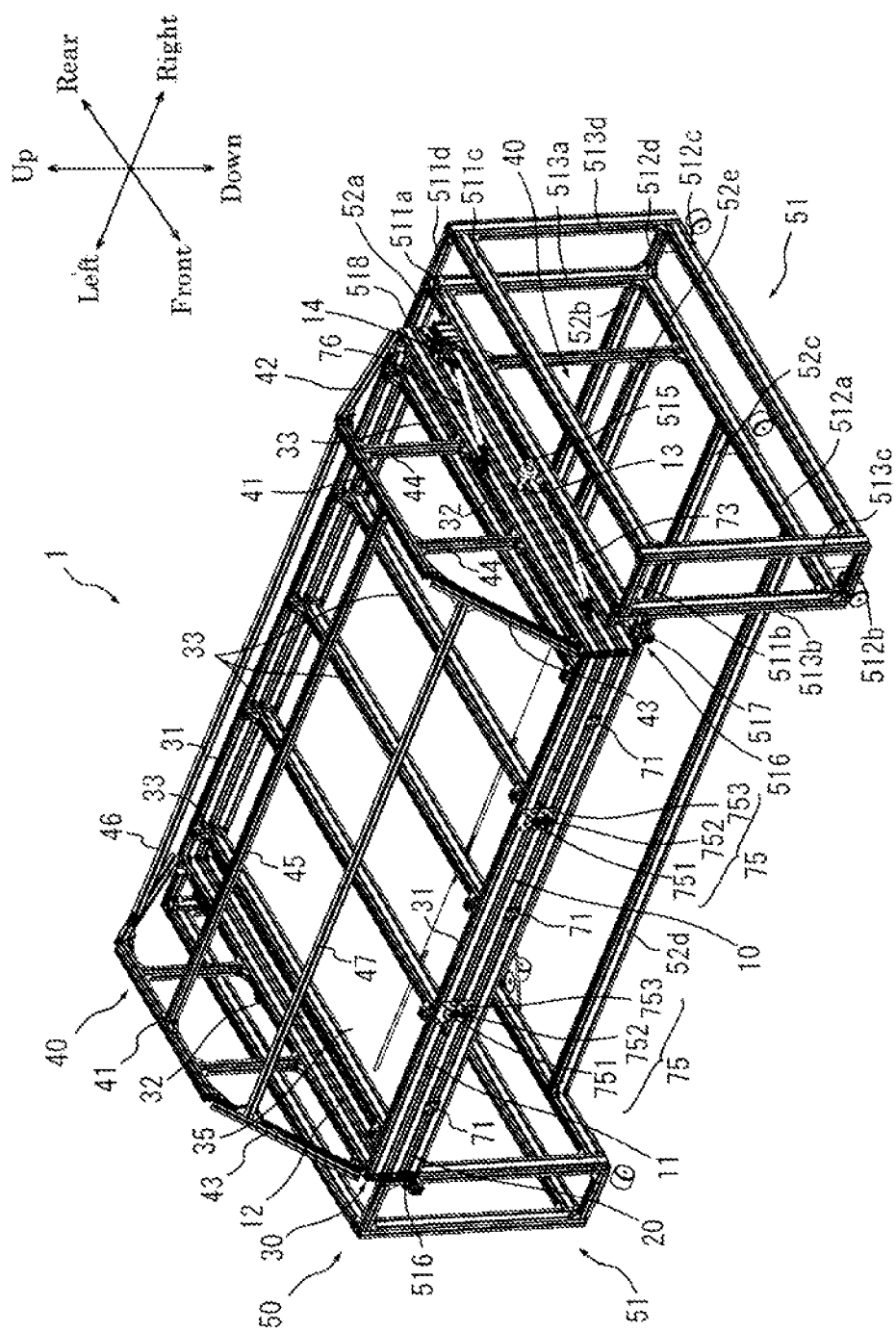
FIG. 11 is a perspective view of the substrate inverting apparatus in a state in which the tray base is inverted.

The lower tray cover 30 includes reinforcing frame members 33 spaced apart from one another at appropriate intervals between the paired right and left frame members 32 and 32 (see FIG. 11). The number of the reinforcing frame members 33 is 5 in the present embodiment, but is not limited to 5. The number and the intervals of the reinforcing frame members 33 may be changed as appropriate for example in view of size of the substrate 2, an amount of warp of the substrate 2 upon a jig such as a suction pad being thrusted on the substrate 2, and a holding state of the substrate 2.

A cushion base 34 and a cushion 35 are provided on the upper surface of the reinforcing frame members 33. Here, the cushion base 34 is a holder plate for holding the substrate 2 and is constituted by a rectangular plate member having an area wider than that of the substrate 2 that is a holding target. The cushion base 34 is preferably made of a metal material, a synthetic resin material, or the like having an appropriate hardness so that the substrate 2 is prevented from being excessively warped upon a jig such as a suction pad being thrusted in order to take out the held substrate 2. Note that the material of the cushion base 34 may be changed as appropriate for example in view of an amount of warp of the substrate 2 upon a jig such as a suction pad being thrusted on the substrate 2 and a holding state of the substrate 2.

The cushion 35 is for example a buffer in a rectangular plate shape for example having approximately the same area as that of the cushion base 34. The substrate 2 is interposed between the cushion 35 and the aforementioned cushion 25 of the upper tray cover 20. Therefore, the cushion 35 is preferably made of a material such as rubber that is soft, that has no chargeability, and that has elasticity sufficient to interpose the substrate 2 in a state of being in contact with electronic components such as a COF and a PCB connected to the peripheral part of the substrate 2.

In the substrate inverting apparatus 1 according to the present embodiment, the cushion bases 24 and 34 and the cushions 25 and 35 each have a wider area than the substrate 2 that is an inversion target and the cushions 25 and 35 are elastic enough to hold the substrate 2 therebetween. In the above configuration, the substrate 2 can be roughly placed on the cushion 35 of the lower tray cover 30 without precise positioning necessitated in placement of the substrate 2 on the cushion 35. Thus, the operator can easily place the substrate 2 on the substrate inverting apparatus 1.

The lower tray cover 30 includes an operation frame 40 for substrate inverting operation. The operation frame 40 is a frame in a trapezoidal shape when viewed from a side, and includes frame members 41, frame members 42, frame members 43, and reinforcing frame members 44 and 44, each of which has a length shorter than the frame members 32. The frame members 41 are disposed in the front-back direction below the respective frame members 32. The respective frame members 42 extend in an oblique direction to connect the frame members 32 to the frame members 41 at their front ends. The respective frame members 43 extend in an oblique direction to connect the frame members 32 to the frame members 41 at their rear ends. The respective reinforcing frame members 44 and 44 are disposed in the up-and-down direction in middle in the front-back direction between the frame members 32 and the frame members 41. Furthermore, the operation frame 40 includes a transverse frame 45 that connects the frame members 41 and 41 located on the right and left ends of the operation frame 40, a transverse frame 46 that connects the frame members 42 and 42 located on the right and left ends thereof, and a transverse frame 47 that connects the right and left frame members 43 and 43 located on the right and left ends thereof (see FIG. 4).

The upper tray cover 20 is joined to the one side (i.e., the rear frame member 11 in the configuration illustrated in FIGS. 1 to 4) of the frame constituting the tray base 10 in a rotatable manner as described above. While on the other hand, the lower tray cover 30 is connected in a rotatable manner to the other side (i.e., front frame member 11 in the configuration illustrated in FIGS. 1 to 4) of the frame that is opposite to the one side of the frame connected to the upper tray cover 20. Specifically, one of the long-side frame members 11 of the tray base 10 and a corresponding one of the long-side frame members 31 of the lower tray cover 30 are joined together at their outer surfaces by means of hinges 74 such that the lower tray cover 30 is rotatable about the tray base 10. Note that three hinges 74 are spaced apart from one another in the longitudinal directions of the frame members 11 and 31 with their axis oriented in the longitudinal directions thereof. One of flaps of each hinge 73 is fixed to the outer surface of the one frame member 11, while the other flap thereof is fixed to the outer surface of the one frame member 31.

The substrate inverting apparatus 1 includes locking mechanisms 75 and 75 (second maintaining mechanism, see FIG. 11) that maintain a closed state of the lower tray cover 30 when the rear frame member 31 of the lower tray cover 30 is in contact with the rear frame member 11 of the tray base 10 (i.e., a state in which the lower tray cover 30 is closed). Each of the locking mechanisms 75 includes for example a hook 751 that is disposed at the lower tray cover 30, a ring 752, and a support plate 753 that is disposed at the tray base 10. The support plate 753 supports the ring 752 in a rotatable manner. Each of the locking mechanisms 75 is located at two parts of the rear frame members 11 and 21. In the present embodiment, the closed state of the lower tray cover 30 can be maintained through engagement of the rings 752 with the hooks 751 in a state in which the lower tray cover 30 is closed.

The substrate inverting apparatus 1 includes rotation mechanisms 76 and 76 that rotate the lower tray cover 30 about an axis of each hinge 74 as a rotation center when the closed state of the lower tray cover 30 maintained by the locking mechanisms 75 and 75 is released, that is, when the rings 752 are disengaged from the hooks 751. Each of the rotation mechanisms 76 is for example a damper and includes a rod 761 extending and contracting in its axial direction and a cylindrical housing 762 that houses the rod 761 (see FIG. 14). The rod 761 has a tip end connected in a rotatable manner to a corresponding one of the frame members 32 of the lower tray cover 30 at a substantial center of the frame member 32 in the longitudinal direction in the frame member 32. The housing 762 has a lower end (end far from the rod 761) connected to a front end of a corresponding one of the frame members 12 of the tray base 10 in the longitudinal direction of the frame member 12 in a rotatable manner. In the above configuration, when the lower tray cover 30 is disengaged from the tray base 10, the rod 761 extends to rotate the lower tray cover 30 in a direction away from the rear frame member 11 (i.e., the one side of the frame opposite to the other side) of the tray base 10 about the axis of each hinge 71 as a rotation center. Note that the lower tray cover 30 is disengaged from the tray base 10 in a state in which the lower side of the substrate 2 faces upward by inverting the tray base 10 upside down.

The support table 50 is a support unit that supports the tray base 10 in a rotatable manner about an axis extending in a transverse direction. The support table 50 includes paired right and left side frames 51 and 51 that each are an assembly in a rectangular parallelepiped shape and transverse frames 52a to 52e that each connect the side frames 51 and 51. In the present embodiment, the support table 50 supports the tray base 10 in a rotatable manner about an axis (i.e., the shafts 13) extending in the left-right direction.

The side frames 51 each include four frame members 511a to 511d forming a rectangular upper plane of the side frame 51, four frame members 512a to 512d forming a rectangular lower plane thereof, and frame members 513a to 513d extending in the up-and-down direction. Here, the frame members 511a, 511c, 512a, and 512c each are a long-side frame member longer than the frame members 12 of the tray base 10, while the frame members 511b, 511d, 512b, and 512d each are a short-side frame member having an appropriate length. Furthermore, the frame members 513a to 513d extending in the up-and-down direction each are adjusted to have a length of for example approximately 60 cm to 80 cm so as to locate a substrate holding surface (i.e., upper surface of the cushion 35) of the lower tray cover 30 at a level that allows the operator to operate easily. Each side frame 51 includes a reinforcing frame member 514 that connects the two long-side frame members 511a and 512a at a location close to the rear of the side frame 51 in the front-back direction.

The transverse frames 52a and 52b are respectively joined to upper ends and lower ends of the frame members 513a and 513a of the two side frames 51. The transverse frames 52c and 52d are joined to the frame members 512a and 512a of the two side frames 51 respectively at a substantial center and a part close to the front of each side frame 51 in the front-back direction. Furthermore, the transverse frame 52e is joined to the reinforcing frame members 514 and 514 of the two side frames 51 at locations close to the lower ends of the respective reinforcing frame members 514 and 514.

The side frames 51 and 51 include bearings 515 and 515 that pivotally support the respective shafts 13 and 13 of the tray base 10. Each of the bearings 515 includes for example an annular rotating support (not illustrate) through which a corresponding one of the shafts 13 is inserted and a bearing housing (not illustrated) that houses the rotating support. The bearing housing is connected to the upper surface of the frame member 511a of each side frame 51 at a location slightly close to the front from the center of the frame member 511a in the longitudinal direction of the frame member 511a.

Figure 5:
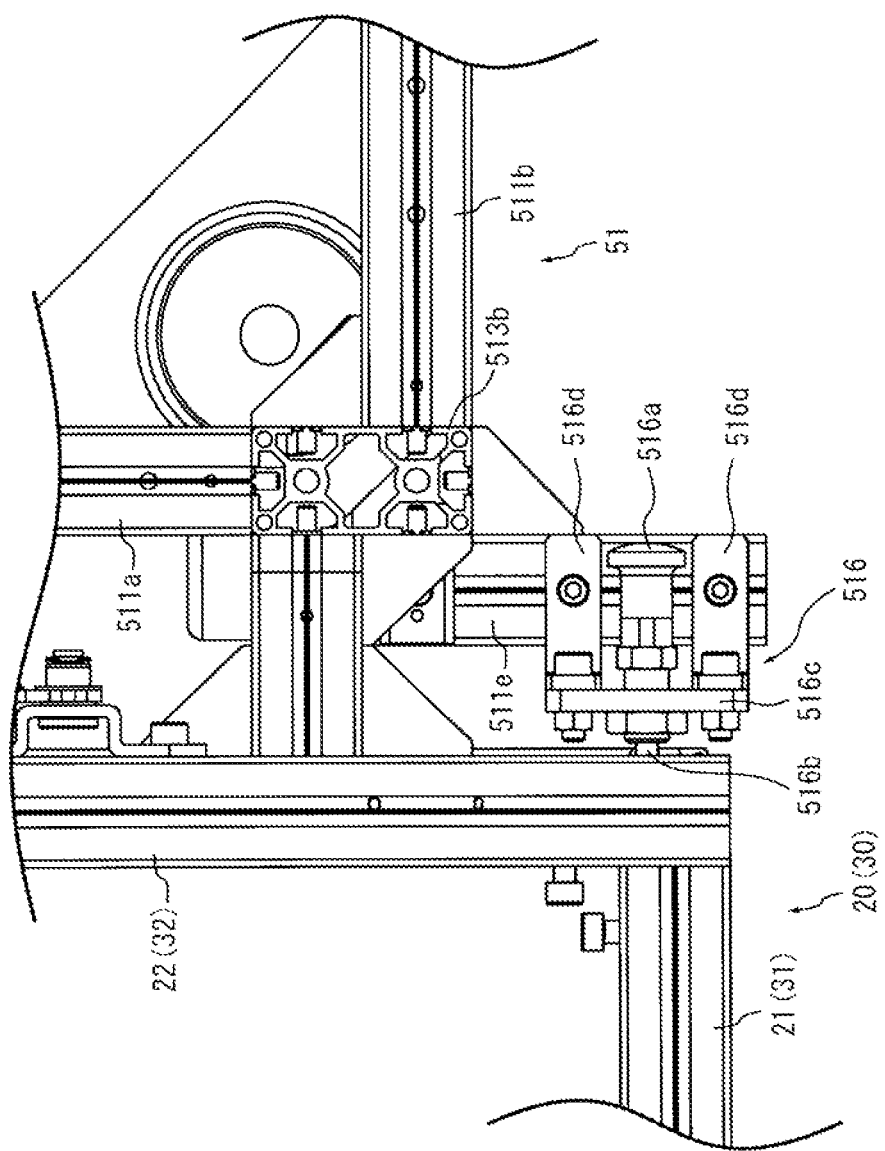
FIG. 5 is a plan view illustrating a configuration of a rotation locking mechanism.

Moreover, the side frames 51 and 51 include rotation locking mechanisms 516 and 516 (third maintaining mechanism) that maintain a state in which rotation of the tray base 10 is restricted. FIG. 5 is a plan view illustrating a configuration of each rotation locking mechanism 516. Each of the rotation locking mechanisms 516 includes for example an operation lever 516a, a fitting piece 516b disposed at a tip end of the operation lever 516a, a holder plate 516c that holds the operation lever 516a in a slidable manner, and attachment pieces 516d and 516d each in an L shape when viewed from front that join the holder plate 516c to a frame member 511e. The frame member 511e is joined to the frame member 513b of a corresponding one the side frames 51 at a location close to the upper end of the frame member 513b. Each of the rotation locking mechanisms 516 is joined by means of the attachment pieces 516d and 516d to the upper surface of the frame member 511e. In order to lock rotation of the tray base 10, the operator slides the operation levers 516a inward (i.e., slides the left operation lever 516a rightward and slides the right operation lever 516a leftward), and fits the fitting pieces 516b into slide grooves formed in the outer surface portions of the respective frame members 32 (or the respective frame members 22). Thus, rotation of the tray base 10 is locked.

The following describes the substrate inverting operation using the substrate inverting apparatus 1.

In order to invert the substrate 2 upside down with it placed on the cushion 35 of the lower tray cover 30, the operator first closes the upper tray cover 20 and engages the upper tray cover 20 with the tray base 10 by means of the locking mechanisms 72.

Figure 6:
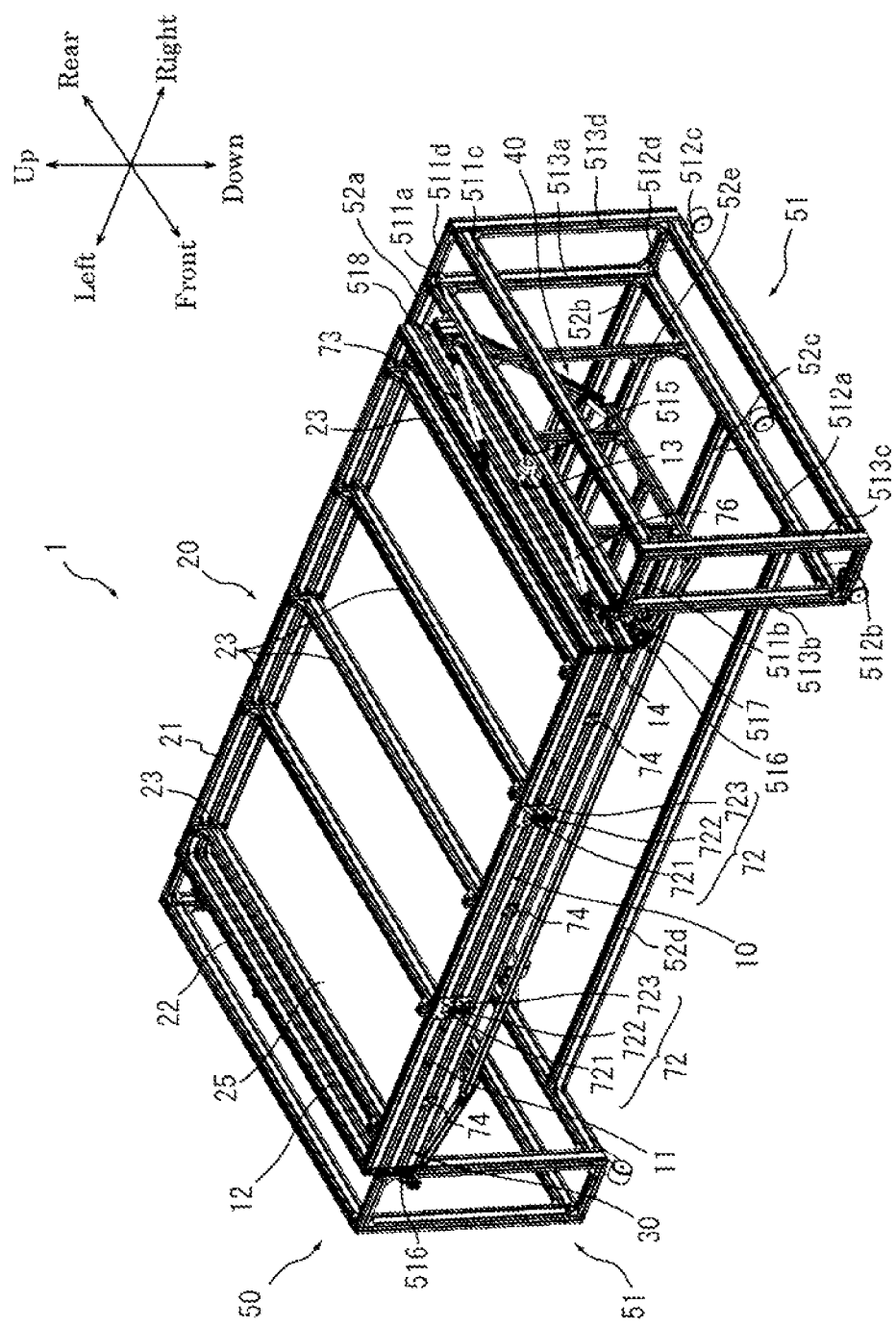
FIG. 6 is a perspective view of the substrate inverting apparatus in a state in which an upper tray cover is closed.
Figure 7:
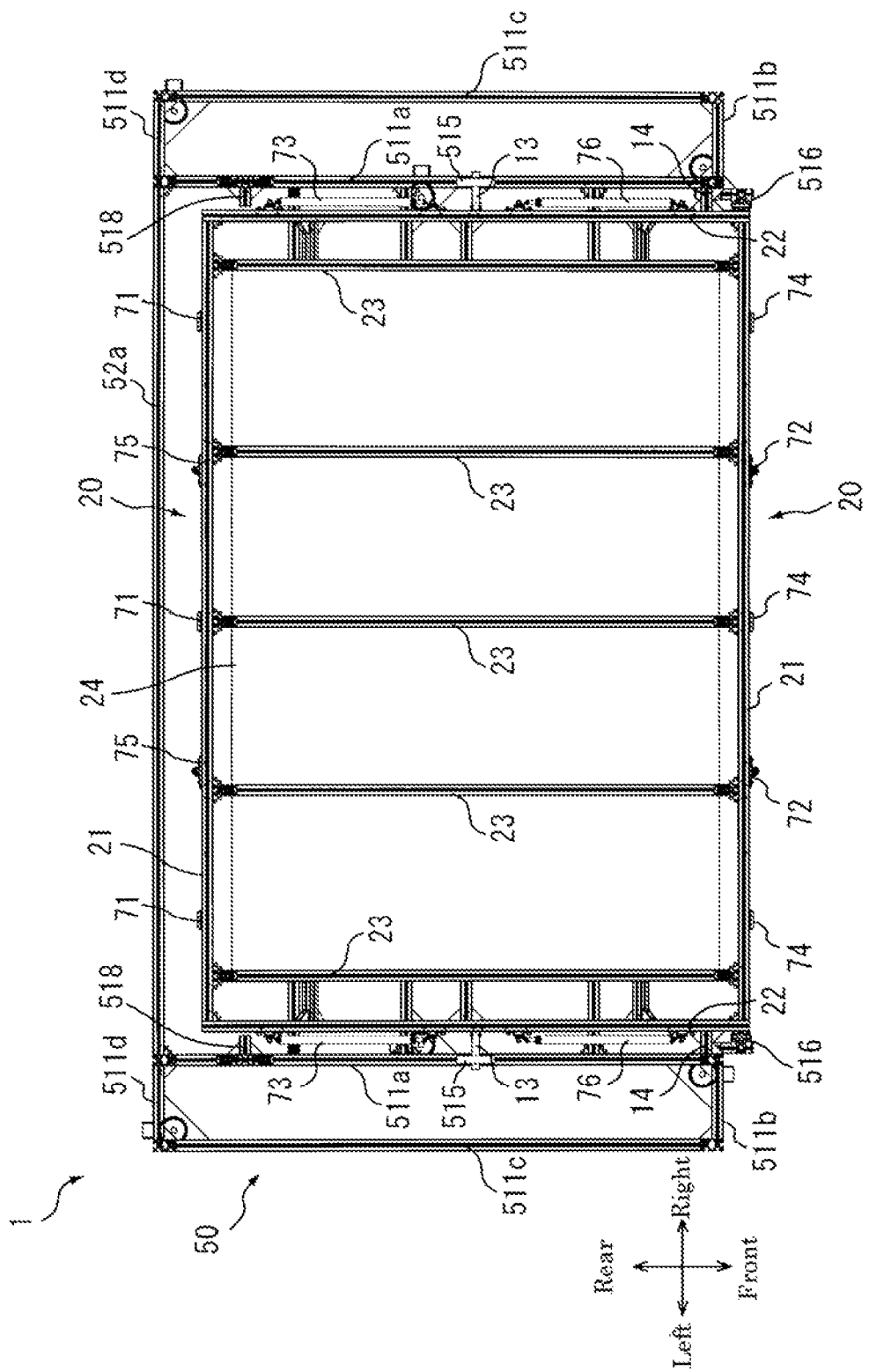
FIG. 7 is a plan view of the substrate inverting apparatus in a state in which the upper tray cover is closed.
Figure 8:
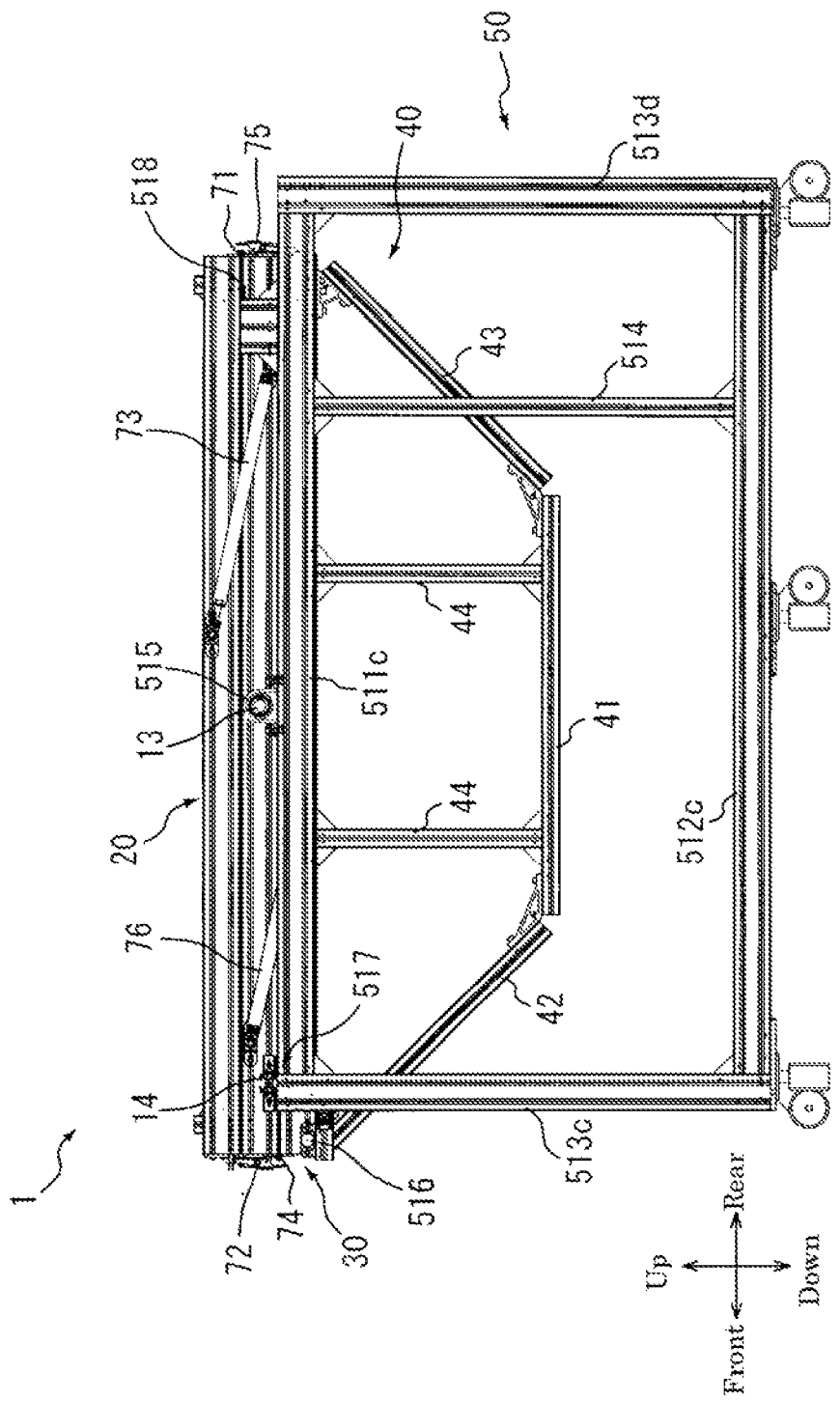
FIG. 8 is a side view of the substrate inverting apparatus in a state in which the upper tray cover is closed.

FIG. 6 is a perspective view of the substrate inverting apparatus 1 in a state in which the upper tray cover 20 is closed. FIG. 7 is a plan view thereof. FIG. 8 is a side view thereof. As described above, the upper tray cover 20 is joined to the tray base 10 in a rotatable manner by means of the hinges 71. Accordingly, the operator can close the upper tray cover 20 by pulling down the upper tray cover 20 toward the operator (i.e., by rotating the upper tray cover 20 anticlockwise in the side view of FIG. 3).

Next, the operator engages the upper tray cover 20 with the tray base 10 by engaging the rings 722 and 722 with the respective hooks 721 and 721 of the locking mechanisms 72 and 72 in the state in which the upper tray cover 20 is closed. Through the above engagement, the substrate 2 is interposed between the cushion 35 of the lower tray cover 30 and the cushion 25 of the upper tray cover 20 so that the position of the substrate 2 is not displaced in rotation of the tray base 10.

Next, the operator operates the operation levers 516*a* and 516*a* of the rotation locking mechanisms 516 and 516 to pull out the fitting pieces 516*b* and 516*b* from the slide grooves of the respective frame members 32 and 32, thereby releasing locking of the tray base 10. The operator then rotates the tray base 10 relative to the support table 50 by grasping the operation frame 40 (specifically, the two front frame members 42 and 42, for example) and pulling up the operation frame 40 toward the operator. Note that the tray base 10 includes the restricting protrusions 14 protruding outward and the restricting protrusions 14 come in contact with the respective protrusion receiving portions 517 of the support table 50. In the above configuration, the tray base 10 is restricted from being rotated anticlockwise when viewed from a side in FIG. 8.

Figure 9:
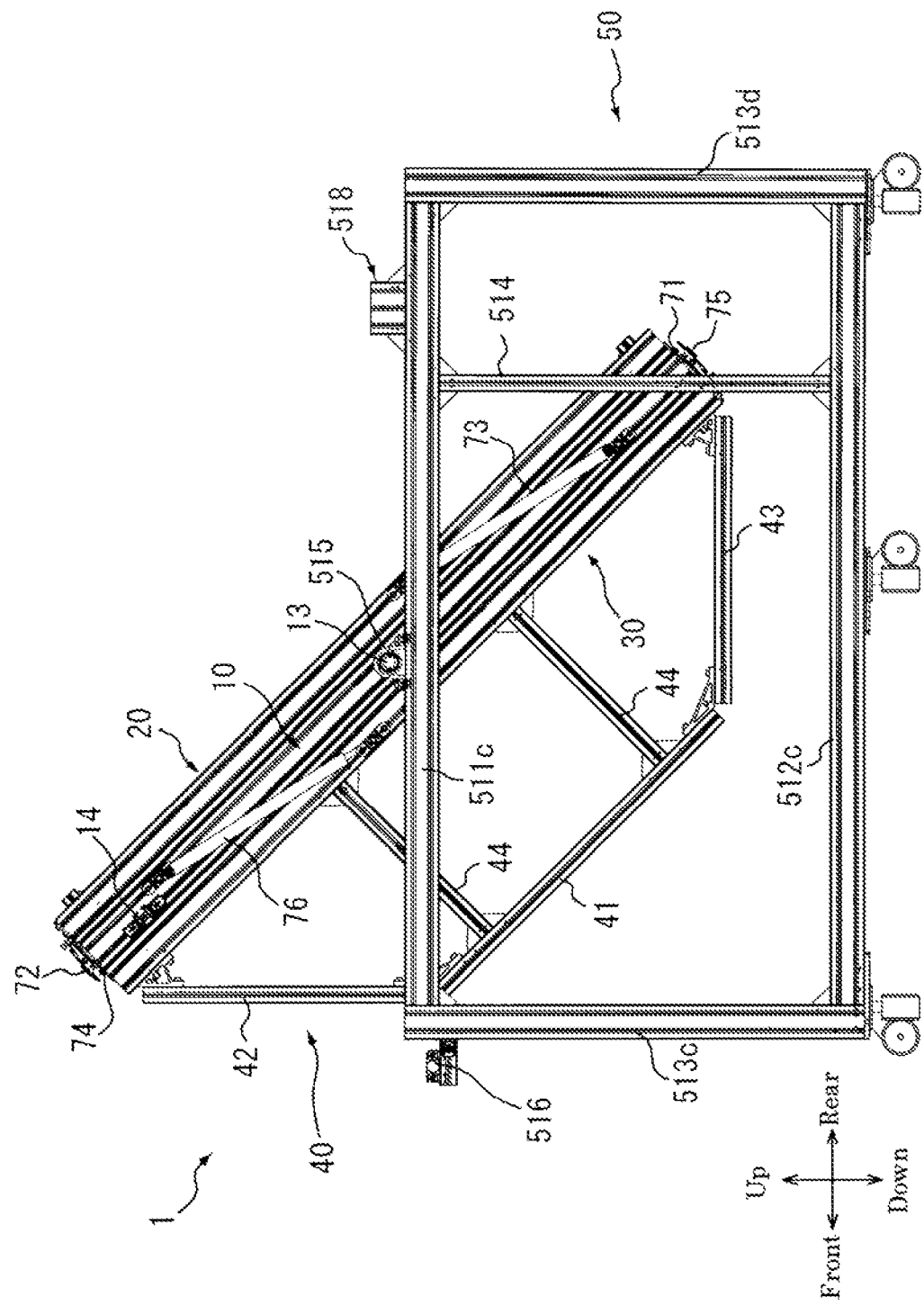
FIG. 9 is a side view illustrating a state in which a tray base is rotated.
Figure 10:
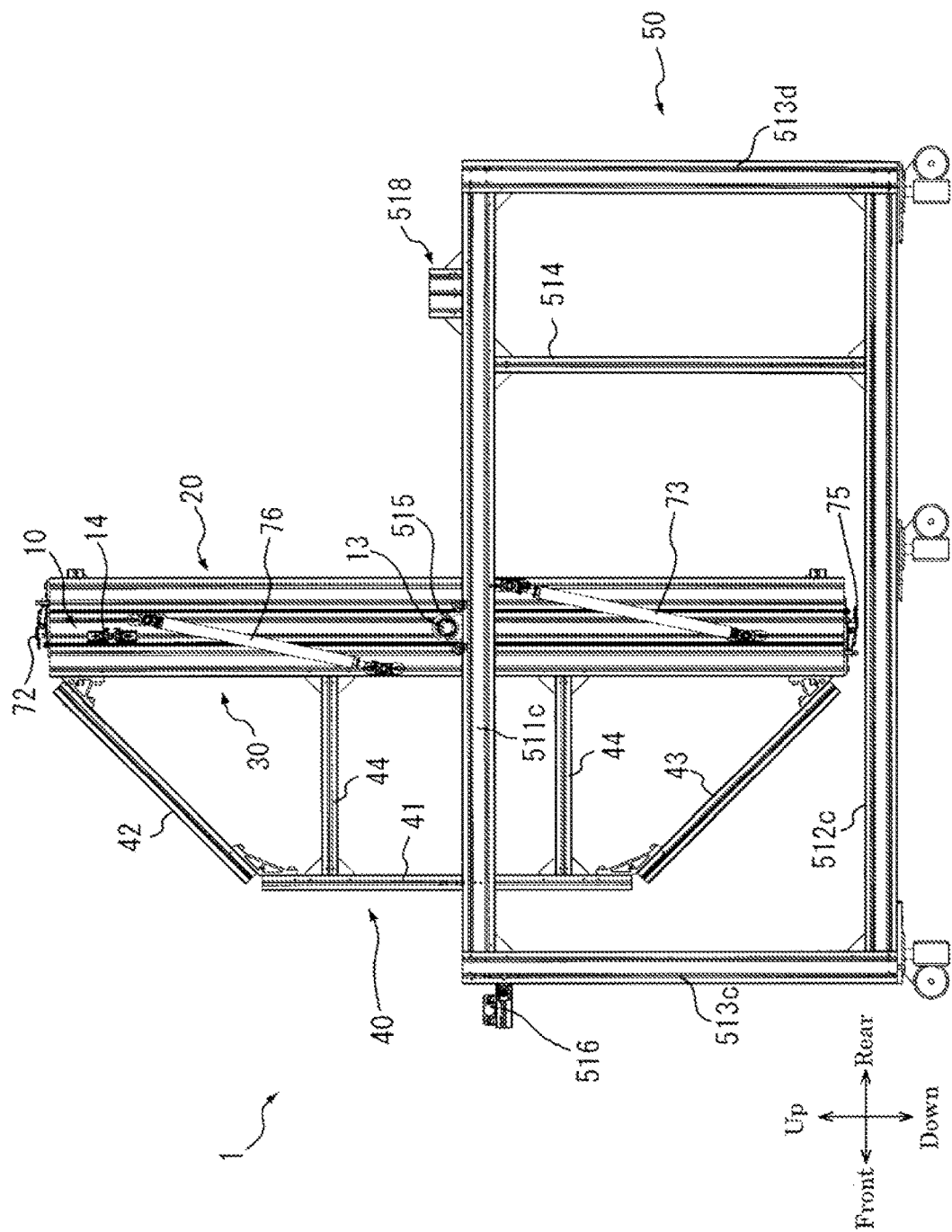
FIG. 10 is a side view illustrating a state in which the tray base is rotated.

FIGS. 9 and 10 each are a side view illustrating a rotating state of the tray base 10. FIG. 9 illustrates a state in which the tray base 10 is in an inclined posture. FIG. 10 illustrates a state in which the tray base 10 is in an upright posture. The operator can easily rotate the tray base 10 by sequentially changing a grasping position in the operation frames 40 in the order of the frame member 42, the frame member 41, and the frame member 43. Note that the tray base 10 includes the restricting protrusions 14 that protrude outward and the restricting protrusions 14 come into contact with the respective protrusion receiving portions 518 of the support table 50 in an inverted state of the tray base 10. In the above configuration, the tray base 10 can be restricted from being rotated in a state in which the lower side of the substrate 2 faces upward.

Figure 12:
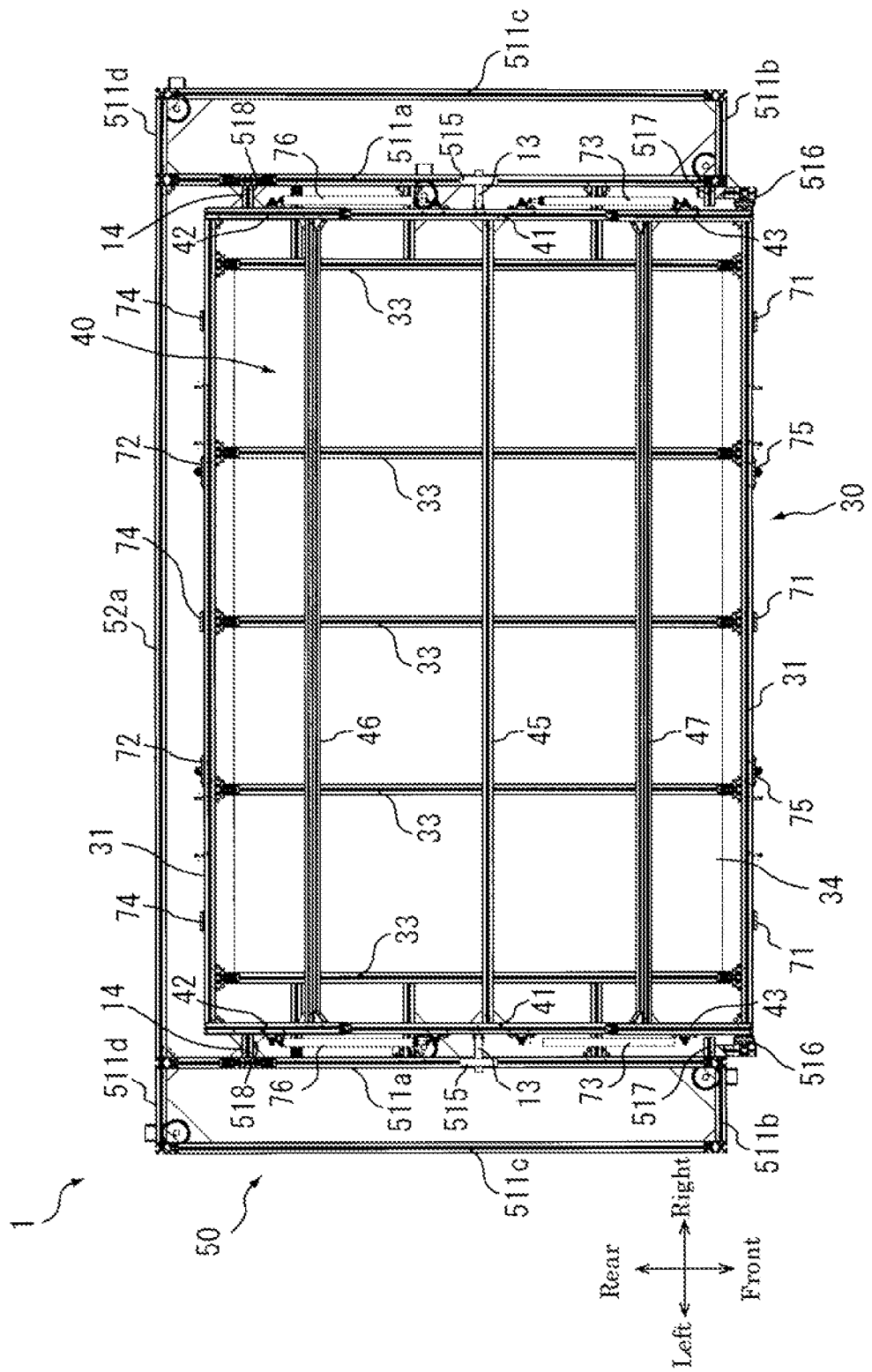
FIG. 12 is a plan view of the substrate inverting apparatus in a state in which the tray base is inverted.
Figure 13:
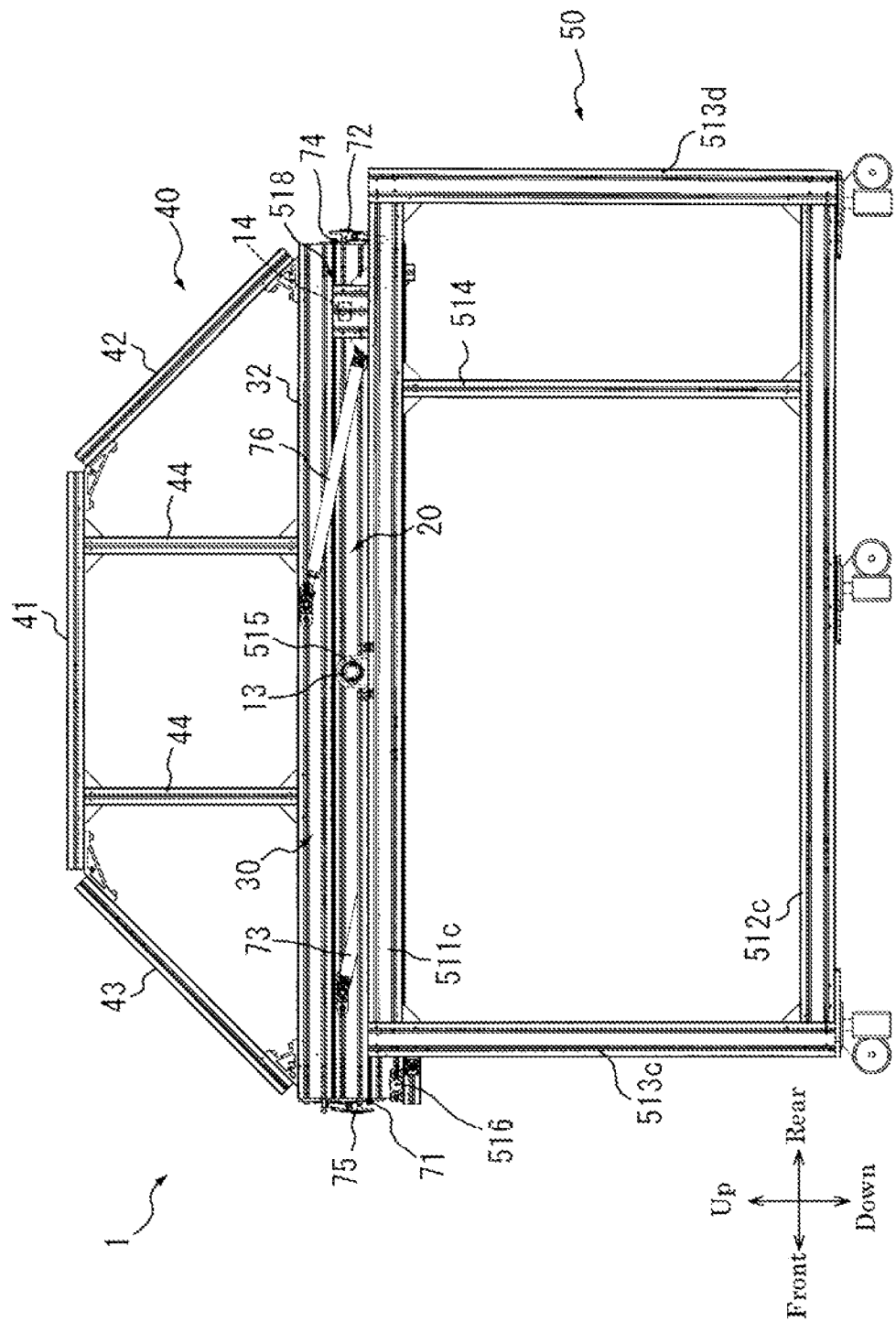
FIG. 13 is a side view of the substrate inverting apparatus in a state in which the tray base is inverted.

FIG. 11 is a perspective view of the substrate inverting apparatus 1 in a state in which the tray base 10 is inverted. FIG. 12 is a plan view thereof. FIG. 13 is a side view thereof. The operator locks the tray base 10 by operating the operation levers 516*a* and 516*a* of the rotation locking mechanisms 516 and 516 in a state in which the tray base 10 is inverted to fit the fitting pieces 516*b* and 516*b* into the slide grooves of the respective frame members 22 and 22. Through the above operation, the state in which the lower side of the substrate 2 faces upward can be maintained.

Subsequently, the operator disengages the tray base 10 from the lower tray cover 30 by taking off the rings 752 of the locking mechanisms 75 from the hooks 751. When the tray base 10 is disengaged from the lower tray cover 30, the rods 761 of the rotation mechanisms 76 extend from the respective housings 762 and the lower tray cover 30 rotates about the axis of each hinge 74 as the rotation center in a direction away from the frame member 11 of the tray base 10 located in front.

Figure 14:
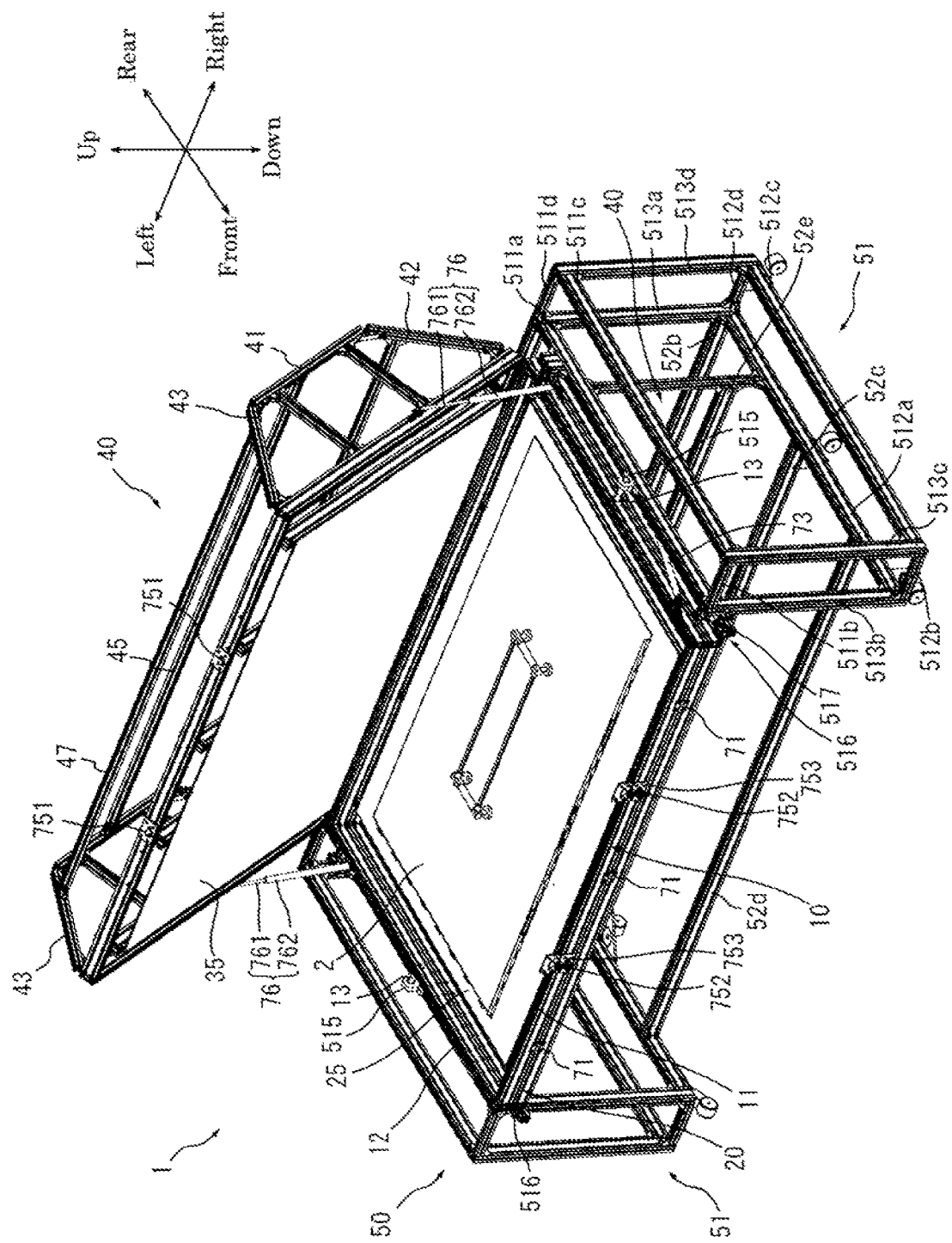
FIG. 14 is a perspective view of the substrate inverting apparatus in a state in which a lower tray cover is open.

FIG. 14 is a perspective view of the substrate inverting apparatus 1 in a state in which the lower tray cover 30 is open. The rotation mechanisms 76 urge the lower tray cover 30 so that the opening angle of the lower tray cover 30 is approximately 60 degrees relative to the tray base 10. In the above configuration, the operator can perform operation to check presence of indentations and the like by observing the lower side of the substrate 2.

As described above, the substrate 2 can be inverted upside down with it interposed between the cushions 25 and 35. Therefore, a possibility that any of the substrate 2 or the electronic components connected to the substrate 2 is broken by substrate inversion can be reduced.

Furthermore, in a situation in which the upper side of the substrate 2 faces upward, release of the locking mechanisms 72 can cause the upper tray cover 20 to be opened from the front toward the rear. By contrast, in a situation in which the lower side of the substrate 2 faces upward (state in which the substrate 2 is inverted), release of the locking mechanisms 75 can cause the lower tray cover 30 to be opened from the front toward the rear. Thus, the operator can always operate in the front of the substrate inverting apparatus 1 without need to move in position for operation.

As described above, the substrate inverting apparatus 1 according to the present embodiment that inverts the substrate 2 upside down includes: a frame 10 in a rectangular frame shape that surrounds the periphery of the substrate 2 that is an inversion target; a first holder 20 that is joined to the one side of the frame 10 in a rotatable manner and that holds the substrate 2 from one side of the substrate 2; a second holder 30 that is joined to another side of the frame 10 located opposite to the one side thereof in a rotatable manner, and that holds the substrate 2 from another side of the substrate 2; and a support unit 50 that supports the frame 10 such that the frame 10 is rotatable about an axis extending in a horizontal direction in a state in which the first and second holders 20 and 30 hold the substrate 2.

In the substrate inverting apparatus according to the present embodiment, it is possible that: the first holder 20 holds the substrate 2 from the one side of the substrate 2 in a state in which the first holder 20 is closed relative to the frame 10; the second holder 30 holds the substrate 2 from the other side thereof in a state in which the second holder 30 is closed relative to the frame 10; and the substrate inverting apparatus 1 further includes: a first maintaining mechanism 72 that maintains the state in which the first holder 20 is closed relative to the frame 10; and a second maintaining mechanism 75 that maintains the state in which the second holder 30 is closed relative to the frame 10.

The substrate inverting apparatus 1 according to the present embodiment may further include a first rotation mechanism 73 configured to rotate the first holder 20 in a direction away from the other side of the frame 10 when maintenance of the state maintained by the first maintaining mechanism 72 is released; and a second rotation mechanism 76 configured to rotate the second holder 30 in a direction away from the one side of the frame 10 when maintenance of the state maintained by the second maintaining mechanism 75 is released.

In the substrate inverting apparatus 1 according to the present embodiment, the first and second holders 20 and 30 may each include: a holder plate 24 or 34 that holds the substrate 2; and a buffer 25 or 35 disposed between the holder plate 24 or 34 and the substrate 2.

The substrate inverting apparatus 1 according to the present embodiment may further include a restricting portion 517 and/or 518 configured to restrict either or both rotation of the frame 10 that starts from a state in which the one side of the substrate 2 faces upward and rotation thereof that starts from a state in which the one side of the substrate 2 faces downward. The rotation thereof that starts from a state in which the one side of the substrate 2 faces upward is restricted when the one side of the substrate 2 faces downward. The rotation thereof that starts from a state in which the one side of the substrate 2 faces downward is restricted when the one side of the substrate 2 faces upward.

The substrate inverting apparatus according to the present embodiment may further include a third maintaining mechanism 516 that maintains either or both a state in which the restricting portion 517 or 518 restricts either or both the rotation of the frame 10 that starts from the state in which the one side of the substrate 2 faces upward and the rotation thereof that starts from the state in which the one side of the substrate 2 faces upward and a state in which the restricting portion 517 or 518 restricts the rotation thereof that starts from the state in which the one side of the substrate 2 faces downward.

The substrate inverting apparatus 1 according to the present embodiment may further include an operation frame 40 that is an assembly of a plurality of frame members 41 to 47 and that is located under the second holder 30.

According to the above configuration, the substrate 2 can be inverted upside down with it interposed between the first and second holders 20 and 30. As a result, a possibility that any of the substrate 2 and the electronic components connected to the substrate 2 is broken by substrate inversion can be reduced.

Furthermore, in the above configuration, placement and taking out of the substrate 2 on and from the substrate inverting apparatus 1 can be carried out in the same direction. As a result, it is unnecessary for the operator to move to the opposite side (the rear side) of the apparatus after substrate inversion, thereby suppressing reduction in operation efficiency accompanied by substrate inversion of the substrate 2.

Note that the presently disclosed embodiment is a mere example in all aspects and should not be construed to be limiting. The scope of the present invention is indicated by the claims rather than by the description given above, and includes all variations that are equivalent in meaning and scope to the claims.

REFERENCE SINGS LIST

1 substrate inverting apparatus
2 substrate
10 tray base (frame)
11,12 frame members
13 shaft
14 restricting protrusion
20 upper tray cover (first holder)
21, 22 frame members
23 reinforcing frame member
24 cushion base (holder plate)
25 cushion (buffer)
30 lower tray cover (second holder)
31, 32 frame members
33 reinforcing frame member
34 cushion base (holder plate)
35 cushion (buffer)
40 operation frame
50 support table (support unit)
71, 74 hinge
72, 75 locking mechanisms (first and second maintaining mechanisms)
73, 76 rotation mechanisms (first and second rotation mechanisms)
51 side frame
515 bearing
516 rotation locking mechanism (third maintaining mechanism)
517,518 protrusion receiving portions (restricting portions)

The invention claimed is:

1. A substrate inverting apparatus that inverts a substrate upside down, comprising:
    a frame in a rectangular frame shape that surrounds a periphery of the substrate that is an inversion target and that includes a first shaft and a second shaft, the first shaft protruding outward in a horizontal direction at a first side of the frame, the second shaft protruding outward in the horizontal direction at a second side of the frame opposite to the first side;
    a first holder joined to a third side of the frame in a rotatable manner and configured to hold the substrate from one side of the substrate in a state in which the first holder is closed relative to the frame, the third side being connected between the first side and the second side;
    a second holder joined to a fourth side of the frame located opposite to the third side thereof in a rotatable manner and configured to hold the substrate from another side of the substrate in a state in which the second holder is closed relative to the frame, the fourth side being connected between the first side and the second side; and
    a support unit that includes a first bearing pivotally supporting the first shaft and a second bearing pivotally supporting the second shaft, and that supports the frame such that the frame is rotatable about axes of the first shaft and the second shaft extending in the horizontal direction in a state in which the first and second holders hold the substrate.

2. The substrate inverting apparatus according to claim 1, further comprising:
    a first locking portion configured to lock the first holder and the frame in the state in which the first holder is closed relative to the frame; and
    a second locking portion configured to lock the second holder and the frame in the state in which the second holder is closed relative to the frame.

3. The substrate inverting apparatus according to claim 2, further comprising:
    a first urging portion configured to urge the first holder in a direction in which the first holder is opened relative to the frame; and
    a second urging portion configured to urge the second holder in a direction in which the second holder is opened relative to the frame.

4. The substrate inverting apparatus according to claim 1, wherein
    the first and second holders each include:
        a holder plate configured to hold the substrate; and
        a buffer disposed between the holder plate and the substrate.

5. The substrate inverting apparatus according to claim 1, wherein the support unit further includes at least one of:
    a first protrusion receiving portion configured to restrict, through coming into contact with a first protrusion protruding from the frame when the one side of the substrate faces downward, rotation of the frame that starts from a state in which the one side of the substrate faces upward; and
    a second protrusion receiving portion configured to restrict, through coming into contact with a second protrusion protruding from the frame when the one side of the substrate faces upward, rotation of the frame that starts from a state in which the one side of the substrate faces downward.

6. The substrate inverting apparatus according to claim 5, wherein the support unit further includes
   a fitting piece that fits in a groove formed in an outer surface portion of the first holder or the second holder and that is configured to slide on the groove in a manner to restrict the rotation of the frame.

7. The substrate inverting apparatus according to claim 1, further comprising
   an operation frame that is an assembly of a plurality of frame members and that is located under the second holder.

* * * * *